United States Patent
Wang et al.

(10) Patent No.: US 8,760,829 B2
(45) Date of Patent: Jun. 24, 2014

(54) LOW-IMPEDANCE HIGH-SWING POWER SUPPLY WITH INTEGRATED HIGH POSITIVE AND NEGATIVE DC VOLTAGE PROTECTION AND ELECTRO-STATIC DISCHARGE (ESD) PROTECTION

(75) Inventors: Liang Wang, Plano, TX (US); Weibiao Zhang, Plano, TX (US); Dening Wang, McKinney, TX (US); John Eric Kunz, Jr., Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 183 days.

(21) Appl. No.: 13/437,352

(22) Filed: Apr. 2, 2012

(65) Prior Publication Data

US 2013/0188286 A1 Jul. 25, 2013

Related U.S. Application Data

(60) Provisional application No. 61/589,451, filed on Jan. 23, 2012.

(51) Int. Cl.
*H02H 9/00* (2006.01)
(52) U.S. Cl.
USPC .......................................................... 361/56
(58) Field of Classification Search
USPC .......................................................... 361/56
See application file for complete search history.

(56) References Cited

U.S. PATENT DOCUMENTS

| 8,120,884 | B2 | 2/2012 | Zhang |
| 2002/0181177 | A1 | 12/2002 | Ker et al. |
| 2004/0095699 | A1 | 5/2004 | Kohno |
| 2011/0195744 | A1 | 8/2011 | Zhang |

FOREIGN PATENT DOCUMENTS

| JP | 2008035067 | 2/2008 |
| JP | 2009302367 | 12/2009 |

OTHER PUBLICATIONS

Paul R. Gray and Robert G. Meyer, Analysis and Design of Analog Integrated Circuits, 3rd Edition, pp. 171-172 and 174.
Behzad Razavi, Design of Analog CMOS Integrated Circuits, Chapter 2: Basic MOS Device Physics, pp. 10-12.

*Primary Examiner* — Jared Fureman
*Assistant Examiner* — Kevin J Comber
(74) *Attorney, Agent, or Firm* — Alan A. R. Cooper; W. James Brady, III; Frederick J. Telecky, Jr.

(57) ABSTRACT

An apparatus comprises a first PFET including a first intrinsic body diode; an electrostatic discharge (ESD) subcircuit coupled to a source of the first PFET; a reverse bias voltage element, such as a zener diode, an anode of which is coupled to a gate of the first PFET; a second PFET having a source coupled to a cathode of the zener diode a capacitor coupled to a gate the second PFET; and a first resistor coupled to the gate of the second PFET. The apparatus can protect against both positive and negative electro static transient discharge events.

27 Claims, 5 Drawing Sheets

LOW-IMPEDANCE HIGH-SWING POWER SUPPLY WITH INTEGRATED HIGH POSITIVE AND NEGATIVE DC VOLTAGE PROTECTION AND ELECTRO-STATIC DISCHARGE (ESD) PROTECTION

PRIORITY

This Application claims priority to U.S. Provisional Application Ser. No. 61/589,451, entitled "Low Impedance High Negative and Positive Power Supply", filed Jan. 23, 2012, which is hereby incorporated by reference in its entirety.

TECHNICAL FIELD

This Application is directed, in general, to electro static discharge (ESD) protection, and, more specifically, to ESD protection that protects from both positive and negative current spikes, wherein the ESD protection includes the integration of three features into one circuit: (1) to allow normal DC operation and provide low impedance when positive power supply is applied; (2) to block negative DC voltage when negative voltage is applied; and (3) to provide current path for both positive and negative ESD events.

BACKGROUND

During the normal course of use for many systems, a source of power will be removed and reconnected over time. Each time the power is reconnected, there may be an opportunity to connect the power improperly. For example, in battery powered applications, a battery may be inserted backwards. In rechargeable systems, a battery charger may be connected incorrectly, or a non-compatible battery charger may be connected. In other systems, a power supply component may be connected to the system incorrectly. A reverse battery, battery charger or power supply connection is dangerous because parasitic diodes of the internal circuits and even ESD (Electronic Static Discharge) circuits can be forward biased and draw a large current. These large currents may damage the ESD structures and internal circuits.

Therefore, there is a need in the art to address at least some of the issues associated with conventional power supply circuits.

SUMMARY

A first aspect provides an apparatus, comprising a first p-type field effect transistor (PFET) including a first parasitic body diode; an electrostatic discharge (ESD) sub-circuit coupled to a source of the first PFET; a reverse bias voltage element, an anode of which is coupled to a gate of the first PFET; a second PFET having a source coupled to a cathode of the reverse bias voltage element a capacitor coupled to a gate the second PFET; and a first resistive element coupled to the gate of the second PFET.

A second aspect provides an apparatus, comprising: a first PFET having a first parasitic body diode; an ESD coupled to a source of the first PFET; a reverse bias voltage element, an anode of which is coupled to a gate of the first PFET; a second PFET, having a second parasitic body diode, having a source coupled to a cathode of the reverse bias voltage element; a first resistive element coupled to a gate of the second PFET; a second resistive element coupled between the gate of the first PFET and ground; a capacitor coupled to a gate the second PFET, wherein the capacitor is coupled in parallel between a drain of the second PFET and the gate of the second PFET, and wherein the first resistive element is also coupled to the ground.

A third aspect provides an apparatus, comprising: a first PFET having a first parasitic body diode; an ESD coupled to a source of the first PFET; a reverse bias voltage element, an anode of which is coupled to a gate of the first PFET; a second PFET, having a second parasitic body diode, having a source coupled to a cathode of the reverse bias voltage element, a first resistive element coupled to a gate of the second PFET; a second resistance coupled between the gate of the first PFET and ground; a capacitor coupled to a gate the second PFET, wherein the capacitor is coupled in parallel between a drain of the second PFET and the gate of the second PFET, wherein the first resistive element is also coupled to the ground, and a first node is coupled to a drain of the first PFET, a drain of the second PFET, and the capacitor.

BRIEF DESCRIPTION OF THE DRAWINGS

Reference is now made to the following descriptions.

DETAILED DESCRIPTION

Figure 1:
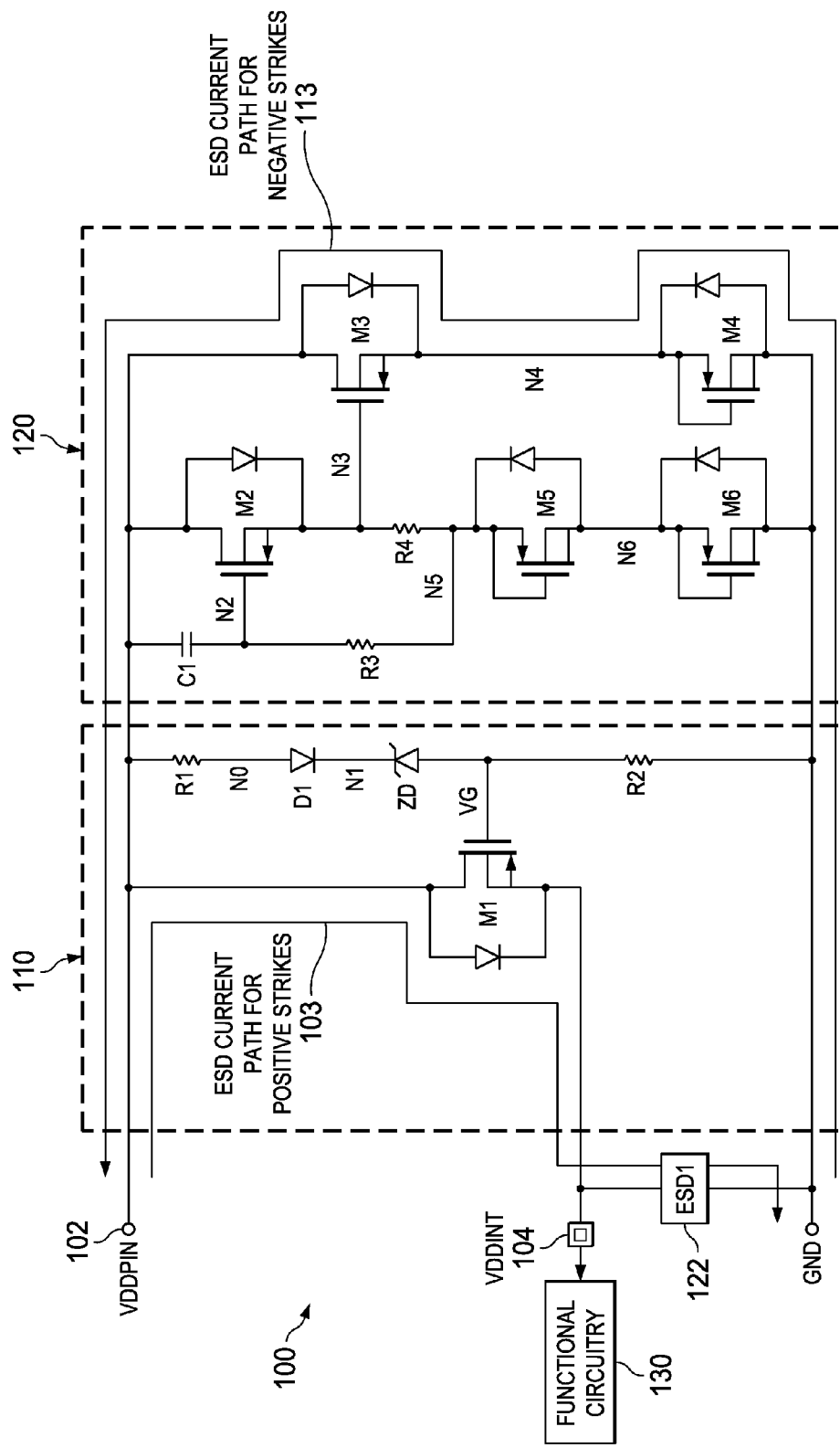
FIG. 1 illustrates a prior art electrostatic discharge (ESD) protection circuitry.

Turning to FIG. 1, illustrated is one example of a prior art voltage protection circuit, as also discussed in U.S. patent application Ser. No. 12/702,699, entitled "Reverse Voltage Protection Circuit," filed Feb. 9, 2010, to Weibiao Zhang, ("'699"), which is hereby incorporated by reference in its entirety.

Generally, in FIG. 1, when a positive DC voltage above a threshold voltage of a zener diode ZD is applied between a VDDPIN input node 102 and a ground (GND) of an ESD circuitry 100, a p-type field effect transistor (PFET) M1 is on. Current flows between the VDDPIN 102 and a VDDINT node 104, which is coupled to a functional circuitry 130, wherein the functional circuitry 130 is that which is to be protected. The PFET M1 is on (a "short") because the reverse bias voltage of the zener ZD is applied between the drain and the gate of PFET M1, and therefore always has PFET M1 turned on. The majority of the rest of the voltage drop between VDDPIN 102 and GND then occurs across R2.

In the ESD circuitry 100, typically there can be two cases of employment.

1. when VDDPIN voltage is lower than the threshold voltage (or breakdown voltage) of the ZD, VG will be pulled to zero voltage or GND voltage by R2.; because drain of M1 is at VDDPIN voltage, source of M1 will be very close to drain voltage due to the parasitic diode, M1 will be on.

2. When VDDPin voltage is higher than breakdown voltage of the ZD, VG voltage will be still lower than that of the VDDPIN. The voltage difference between drain and VG of M1 will be higher than the threshold voltage of the PFET, this will help guarantee M1 will still remain on.

Moreover, regarding an additional reverse voltage tolerant ESD circuit 120 of the ESD circuitry 100, PFETs M4, M5 and M6 are always off when VDDPIN is positive, as the gate and the source of these PFETs are always coupled and therefore less than a threshold value $V_T$ of its corresponding PFET, and the drain of each PFET is at zero voltage or lower than its source and the gate voltage, i.e. for M4 and M6, their drain nodes are coupled to ground, for M5, its drain node voltage is lower than the source and gate node voltage, so the PFETs M4, M5, and M6 are off. Moreover, C1 blocks the DC component of the positive voltage of VDDPIN 102. N5 is a little lower than the positive power supply.

Furthermore, the PFET M4 blocks any current through PFET M3 from VDDPIN 102 for a positive voltage, so even though the voltage difference between the drain of PFET M3, and the gate N3 can be significantly higher than zero, this leg of the ESD circuit 100 is again off. Therefore, under positive DC conditions, there is no current flowing from VDDPIN 102 through the branches consisted of M3, M4 and of M2, R4, M5, M6 to GND. The voltage drop between VDDPIN 102 and GND occurs substantially between the drain and the source of PFET M4 for the branch consisted of M3 and M4. For the branch consisted of M2, R4, M5 and M6, the voltage drop is shared between M5 and M6.

If a large positive voltage spike/transient strikes VDDPIN 102 (i.e., a large voltage transient occurs), M1 would still stay on, due to the continuing reverse bias of the zener diode ZD discussed above, and convey a positive current from the VDDPIN 102, and an electrostatic discharge subcircuit (ESD1) 122 would convey a positive current pulse to ground through its own protection circuitry, thereby protecting the functional circuitry 130. For more information on subcircuit ESD1 122, please see '699. Additionally, when a large positive voltage spike strikes VDDPIN 102. The parasitic body diode of M1 is forward biased and can shunt current to ESD1 122.

However, if a negative DC voltage were applied between VDDPIN 105 and GND, the circuit 100 could function as follows. D1 would block a current flow from GND to VDDPIN 105. Therefore, VG would be at GND voltage. Drain voltage of M1 would be that of VDDPIN 105, which is negative. Source voltage at M1 would be very close to zero, as derived from the subcircuit ESD1 122, so therefore M1 is "open", blocking current flowing from the ESD1 122 circuit and the functional circuitry 130 to VDDPIN 102.

Please note that PFETs have an intrinsic, parasitic "body diode" as part of their internal configuration. For more information regarding body diodes, please see "Analysis and Design of Analog Integrated Circuits, $3^{rd}$ edition" by Paul R. Gray/Robert G. Meyer, page 171-172 and 174, hereby incorporated by reference in its entirety, wherein it discusses how parasitic body diodes are formed by the PN junctions of the MOS transistors. Moreover, please see the "Design of Analog CMOS Integrated Circuits" by Behzad Razavi, Chapter 2: Basic MOS Device Physics", page 12, also incorporated by reference in its entirety, wherein it discusses a junction diode from a drain node to a body node, wherein the cathode node of the junction diode is shorted to the source node.

Regarding the additional reverse voltage tolerant ESD1 subcircuit 122, for a negative DC voltage, N2 is two body diode voltage drops from GND, as these are the body drops of M5 and M6, and there would be no current through R3. Therefore, the drain of M2 is less than the gate of M2, and the source of M2 are two body diode voltage drops down from GND (the body diodes of M6 and M5), so therefore, M2 is off. Therefore, the gate at N3 of M3 is also two voltage drops from zero, which is higher than the M3 drain voltage. However, M3 is unable to conduct because M3 is also turned off.

However, if there is a negative ESD transient, the additional reverse voltage tolerant ESD circuit 120 can work as follows. The capacitor C1 is pulled down with the transient charge, therefore the gate of PFET M2, node N2, is also pulled down. However, the voltage at the source of PFET M2, node N3, is still close to two body diode voltages lower than zero. Therefore, PFET M2 is turned on and shorted, and N3 is at VDDPIN 102 negative transient voltage, therefore, PFET M3 is turned on and shorted, and a reverse current flows from GND to VDDPIN 102 through PFET M4 and PFET M3. In the circuit 120, the resistor R4 helps to ensure that a reverse current through M6, M5 and M2 is kept below a minimum threshold to avoid overwhelming PFETs M6, M5 and M2.

In the circuit 100, if a negative ESD spike transient occurs, M2 is on, and this pulls down N3, so that M3 is on and dumps a large current through the branch of M4 and M3. M3 and M4 are sized big enough to dump enough current quickly. At the beginning of the negative strike, there is also a voltage drop between node N5, which is two body diode voltage drops from GND, and VDDPIN 102, which becomes distributed across R3 and C1. Therefore, C1 starts to charge up until the capacitor has a voltage across it equal to the voltage drop from N5 and VDDPIN. As the voltage across C1 reaches the voltage from VDDPIN 102 to N5, the gate of M2, N2 is then pulled equal to its source N3, and therefore PFET M2 becomes open, and N3 is forced close to GND. Then, the gate of the PFET M3 is not lower than its source by more than $V_T$ of PFET M3, so PFET M3 of ESD circuitry 100 will be turned off gradually.

Figure 2:
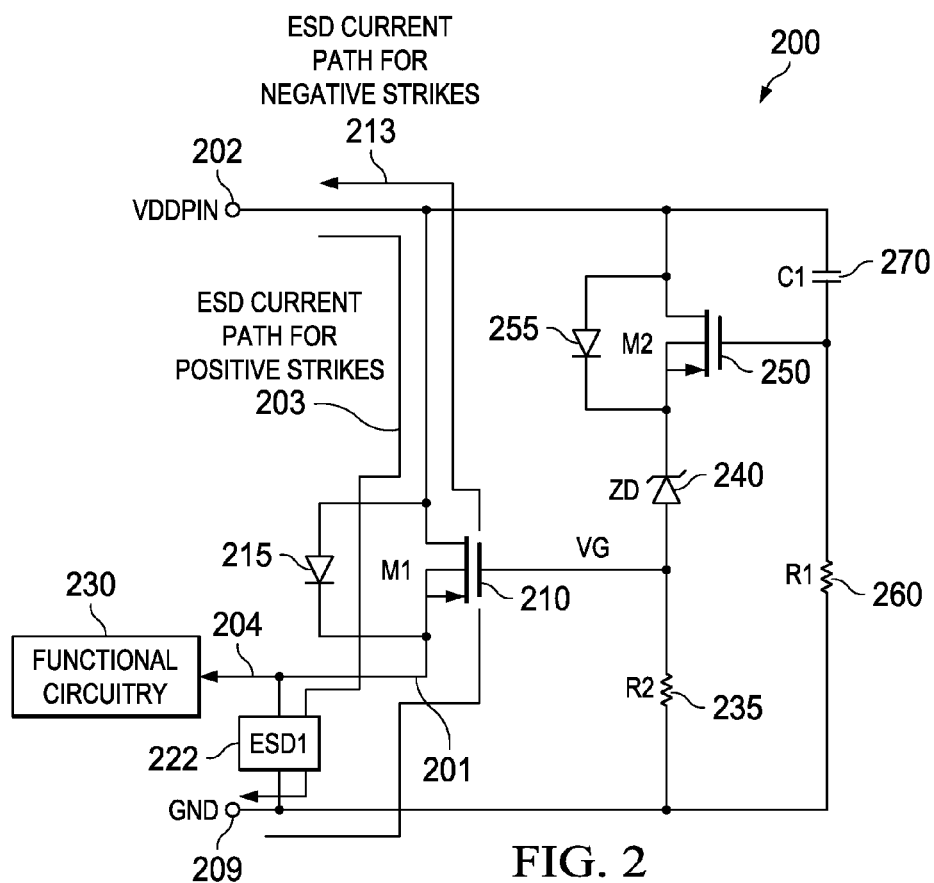
FIG. 2 illustrates an embodiment of an ESD protection circuit constructed according to the principles of the present disclosure.

FIG. 2 illustrates an ESD protection circuit 200 constructed according to the principles of the present disclosure. In the circuit 200, a VDDPIN 202 is coupled to a drain of a PFET M1 210 having a body diode 215. A source of the PFET M1 201 is coupled to a VDDINT node 204, an output node of the apparatus, which is coupled to a functional circuitry 230. An ESD1 subcircuit 222 is coupled to the VDDINT 204 and a GND 209. Please note that the ESD1 222 will output a voltage between GND and node VDDINT 204 a voltage from GND to a maximum allowable voltage, such as 40 volts, although other allowable maximum allowable voltage are generally determined by process technologies and devices used.

Please note that the intrinsic, parasitic body diodes, such as body diodes 215 and 255, are illustrated for ease of explanation of the ESD protection circuit 200 in FIG. 2, and not in and of themselves an additional element within the circuit 200; rather, they are employed within the circuit 200 as an intrinsic part of its corresponding PFET.

In a further aspect, the PFET M1 210 is a Drain Extended PMOS (DEPMOS), which has a non-symmetrical structure. The non-symmetrical structure of the M1 PFET 215 can allow a PFET to survive higher voltage across Drain to Source, Drain to Gate and normal Gate to Source voltages.

In the ESD protection circuit 200, a drain of the PFET 250, having a body diode 255, is also coupled to VDDPIN. A source of the PFET M2 is coupled to a cathode of a zener diode 240. An anode of the zener diode 240 is coupled to a gate of the PFET M1 210, at a node VG. A resistor R2 235 is also coupled to between the node VG at the gate of the PFET M1 210 and the GND 209.

Although zener ZD 240 provides reverse blocking voltage, in a further aspect, a reverse bias voltage element can be substituted that when the reverse element biased is reverse biased, it is off, and when it is higher than some threshold voltage like 3V or 7V, it will be forced to be shorted. If it is forward biased, then it is a short.

In the ESD protection circuit 200, a capacitor 270 is coupled in parallel between the VDDPIN 202 node and a gate of the M2 250. A resistor 260 is coupled between the gate of the PFET M2 250 and the GND 209.

In one aspect, the ESD protection circuit 200 can work as follows.

When a positive DC voltage is applied between the VDDPIN 202 and the GND 209, the drain of PFET M2 250 is at VDDPIN. The gate of PFET M2 250 is at GND voltage 209, due to the DC blocking of the C1 270 and R1 conducting between GND 209 to the gate of the M2. Therefore, PFET M2 is "on", and a voltage drop then occurs across the reverse biased ZD 240. The voltage drop across the reverse biased ZD 240, and a voltage drop across PFET M2 250 are then applied between the drain and gate of PFET M1 210. Total voltage drop is larger than the threshold voltage of M1. Therefore, PFET M1 210 is on, VDDINT 204 is at the voltage of VDDPIN 202 minus a voltage drop across PFET M1 210. Since the M1 is "on", the impedance of the M1 is low, and therefore the voltage drop between 202 and 204 is small, and therefore a low impedance power supply.

In the event of a positive voltage spike/transient on the VDDPIN 202, such as more than 40 volts, the circuit 200 can work as follows through a mitigation of the voltage spike through a conveyance of current from VDDPIN 202 to GND 209. The positive voltage at the drain of PFET M2 210 will be pulled up to the positive voltage spike of VDDPIN 202. Therefore, there will still be a reverse bias voltage drop across ZD 240 which can be, for example, about 7 volts and a voltage drop across PFET M2 250, which is applied between the drain and the gate of PFET M1 210. PFET M2 250 will still be on because the drain of M2 255 will still be higher than the gate of M2 255. Therefore, the PFET M1 210 is still on and conducting from VDDPIN 202 to GND 209 through its body diode 215. Then, a positive current is absorbed by the ESD1 subcircuit 222 through an ESD current path for positive strikes 203, mitigating the voltage spike of VDDPIN 202. Even if M1 210 is not on, the parasitic body diode 215 of M1 210 will shunt positive ESD current to ESD1 222.

In some aspects of the circuit 200, the values of R1 260 and C1 270 can be adjustable, such as by a user of the circuit 200. For example, the C1 270 can be a varactor, and the R1 260 can be a transistor that gives an equivalent variable resistance.

For a negative DC voltage applied to VDDPIN 202, the circuit 200 can work as follows. The gate of PFET M2 250 is at zero volts due to both the DC blocking of C1 270 and being coupled over R1 260 to GND 209. However, the drain of PFET M2 255 is at the negative DC voltage. The source of PFET M2 255 will also be at a lower voltage potential than the gate of PFET M2 255. Therefore, PFET M2 250 is not conducting. Therefore, VG is at the GND 209 voltage, which means that VG is at a higher voltage than VDDPIN 202, therefore the drain to source voltage is off for PFET M1 210. Moreover, the source of PFET M1 210 sees the GND 209 voltage conveyed from subcircuit ESD1 222, so M1 201 is also off. C1 270 blocks DC negative voltage.

For a negative voltage strike at the VDDPIN 202, the circuit 200 can work as follows to mitigate the voltage strike through conveyance of a current from GND 209 to VDDPIN 202. The voltage across the capacitor C1 270 does not instantaneously change for the negative voltage strike. Therefore, the gate of PFET M2 250 is temporarily brought to the VDDPIN 202 negative strike voltage. Therefore, there is a positive voltage difference across source to gate of PFET M2 255, and therefore PFET M2 255 starts to conduct source to drain. ZD 240 is forward biased, it will short VG to drain of M2 250. Therefore, current will flow from GND 209 to VDDPIN 202 for this transient through PFET M2 250, but limited by the resistance of M2. When M1 210's gate is pulled down to close to VDDPIN 202, M1 is ON to convey a transient current from GND, through subcircuit ESD1 122 and M1 to VDDPIN to mitigate the negative voltage strike.

For FIG. 2, for negative voltage strikes, there can be an RC time limit as to how long an ESD current path 213 for a negative strike lasts. A subcircuit ESD1 222 and M1 210 are utilized to perform negative ESD protection to the internal circuit block 230. This time constant can be calculated from the RC values of R1 260 and C1 270. The larger the resistor value of R1 260 and capacitance of C1 270, the longer the time it would take before the circuit 200 would stop the negative current path 212 through the M1 210 to the subcircuit ESD1 222.

Regarding the circuit 200, this circuit 200 can have at least the following advantages. The circuit 200 can have a small silicon area than that of circuit 100 in FIG. 1. Moreover, a number of elements of FIG. 1 are removed. Generally, the most area consuming parts for negative ESD protection in FIG. 1 are M3, M4, which are not needed in the circuit of FIG. 2 anymore. The standalone physical elements of M5, M6 and R4 are not needed either. One example layout of the implementation showed 27% area saving. The PFET M1 210 has low impedance during positive voltage operation that is within the voltage parameters of the circuit 200, which in one aspect, can be a positive 40 volt rail applied at the VDDPIN 202, which can block negative voltage. Moreover, the circuit 200 can provide ESD protection to the functional circuitry 230 for both positive and negative strikes.

As compared to the '699 Application, ESD protection 200 has a simpler topology that, nonetheless, still offers protection against positive and negative voltage strikes. The circuit 200 can eliminate a need for discrete components on a printed circuit board. In some prior art circuits, various components for ESD protection needed to be off the chip, since they have to be outside of the integrated circuit IC. Also, the circuit 200 can consume a smaller silicon area when compared to circuit 100, as will be described in more detail in FIG. 3.

The circuit 200 can be customized to meet different ESD targets, for example through varying the values of R1 260 and C1 270. The circuit 200, with or without the functional circuitry 230, may also be packaged into a stand-alone integrated circuit (IC) or be part of a design that offers a conditioned voltage for an internal circuitry.

In the circuit 200, M1 210 can have a "large" total finger width to reduce impedance. The low value depends on how low the impedance which the circuit 200 is designed, and the process with which it is implemented.

Generally, in one aspect, the ESD circuit 200 of FIG. 2 has consolidated the functionality of R1 of FIG. 1 into PFET M2 210 of FIG. 2, the diode D1 of FIG. 1 is functionally incorporated into the body diode of M1 210, and the functionality of PFET transistors M3, M4, M5 and M6 from ESD circuitry 100 of FIG. 1, has consolidated into PFET M1 215 and its controlling circuitry of ESD protection circuit 200. Therefore, when comparing ESD protection circuit 200 to prior art ESD protection circuit 100, there has been a retention of functionality of omitted elements of ESD protection circuit 100 of FIG. 1 within ESD protection circuit 200.

Moreover, in the ESD 200, PFET M1 210 is employed for a current pathway for a negative strike 213, which in the prior art of FIG. 2, would have been conveyed through M3 and M4 of ESD circuitry 100. However, in the ESD circuit 200, PFET M1 210 is advantageously employable as a conduction path for both positive and negative strikes, reducing the elements of an ESD circuit when compared to ESD protection circuitry 100, yet without these elements, and negative strike protection has been integrated into PFET M1 210. Indeed, when compared to ESD protection circuitry 100, a dedicated C1/R3/M2/M3/R4/M5/M6 current path has been eliminated, and a number of these elements emitted in the circuit 200, yet their functionality is retained.

Figure 3:
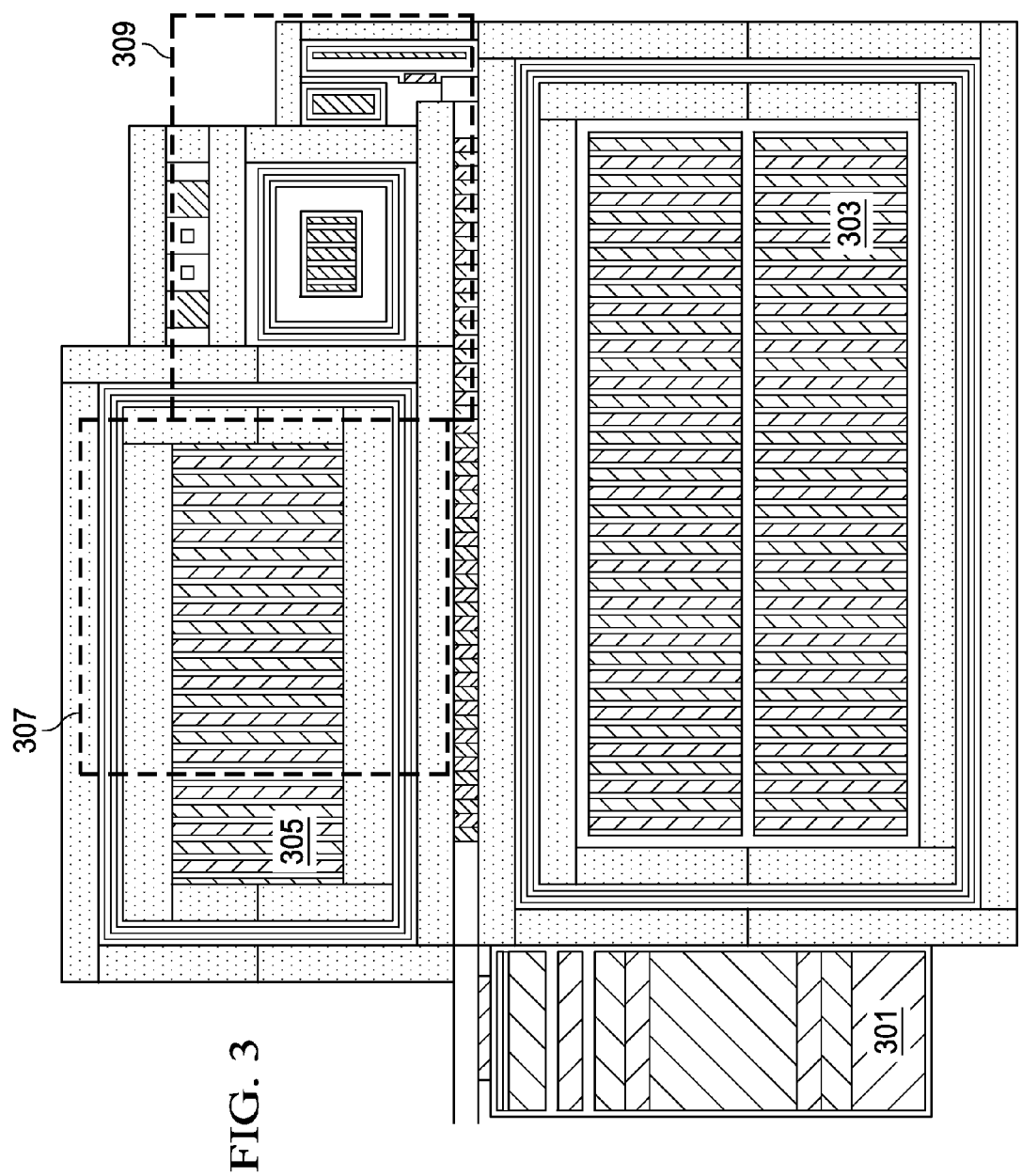
FIG. 3 is an illustration of a comparison of a circuit footprint between the circuitry of FIG. 1 and a circuit of FIG. 2.

FIG. 3 is a layout example of the circuit 100, and how the circuit 200 can take up less of the IC footprint. The circuit 300 (I assume it means the entire area in FIG. 3) has an area of 900*800 um*um; 301 corresponds to ESD1 122 in FIG. 1 with an area of 400*130 um*um; 303 corresponds to M1 in FIG. 1; 305 is M3 in FIG. 1; 307 and 309 are the areas no longer needed for circuit 200, which correspond to M4, M5, M5, R4, R3 M2, and part of C1 and M3. Total area of 307 and 309 is ~550*400 um*um.

Figure 4:
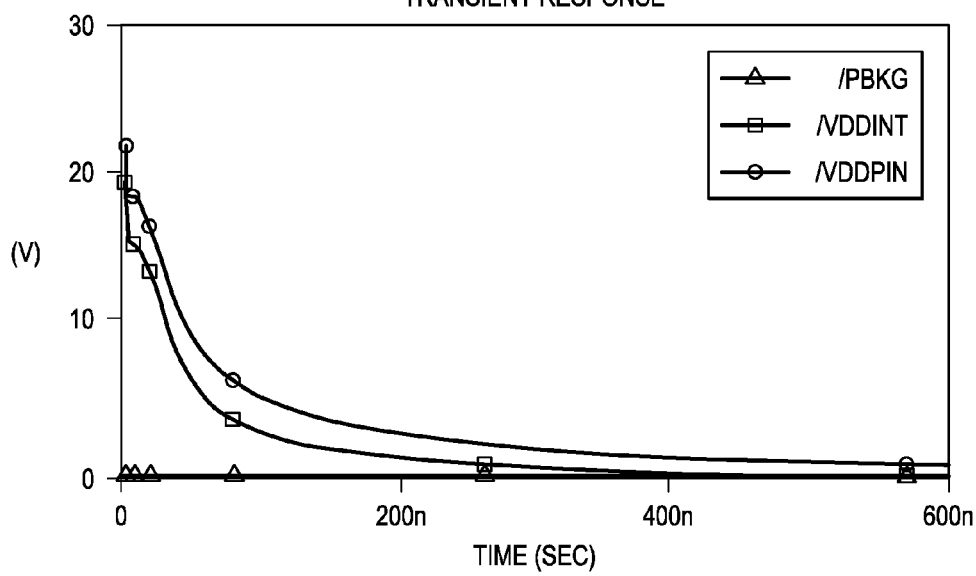
FIG. 4 is a voltage vs. time simulation of an ESD strike of a positive polarity between VDDPIN and GND nodes of the ESD protection circuit of FIG. 2.

FIG. 4 illustrates an example ESD protection 200 performance simulation for a positive polarity ESD strike. In the illustration, a 2 kV Human Body Model (HBM), which assumes a human body is a charged capacitor with 2000 Volt voltage, and when one uses one's hand to touch the circuit accidentally, the circuit under attack will suffer from this strike. A strike was simulated from VDDPIN to ground. The ESD protection circuit 200 selected for this illustration can sustain 40V DC voltage VDDPIN has a peak voltage at 19V and VDDINT has a peak voltage at 16 V, and as these voltages have an absolute value of less than 40V, so the circuit 200 can survive the positive 2 kV HBM strike. The two graphs represent the voltage at VDDPIN 202 and VDDINT 204, respectively, at various times.

Figure 5:
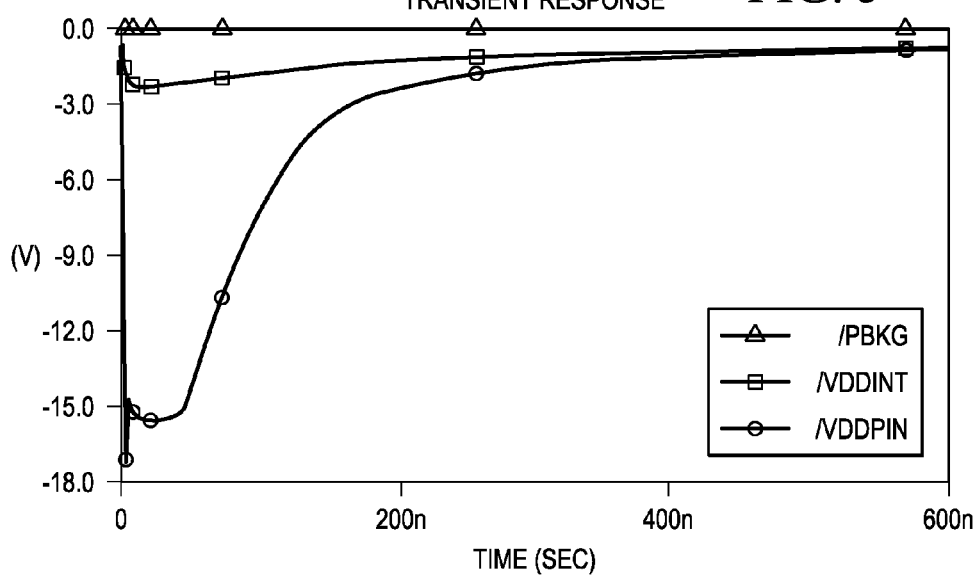
FIG. 5 is a voltage vs. time simulation of an ESD strike of negative polarity between VDDPIN and GND nodes of the ESD protection circuit of FIG. 2.

FIG. 5 illustrates an example ESD protection 200 performance simulation for a negative polarity ESD strike. In the illustration, a 2 kV HBM. A negative strike was simulated from VDDPIN to ground. VDDPIN clamped at −15.4V and VDDINT clamped at −2.4 V, as the absolute value of these voltages are less than 40V, so the ESD circuit 200 can survive the negative 2 kV HBM strike. The two graphs represent the voltage at VDDPIN 202 and VDDINT 204, respectively, at various times. As is illustrated, the VDDINT 204 has a significant protection from a negative voltage transient applied to VDDPIN 202.

Figure 6:
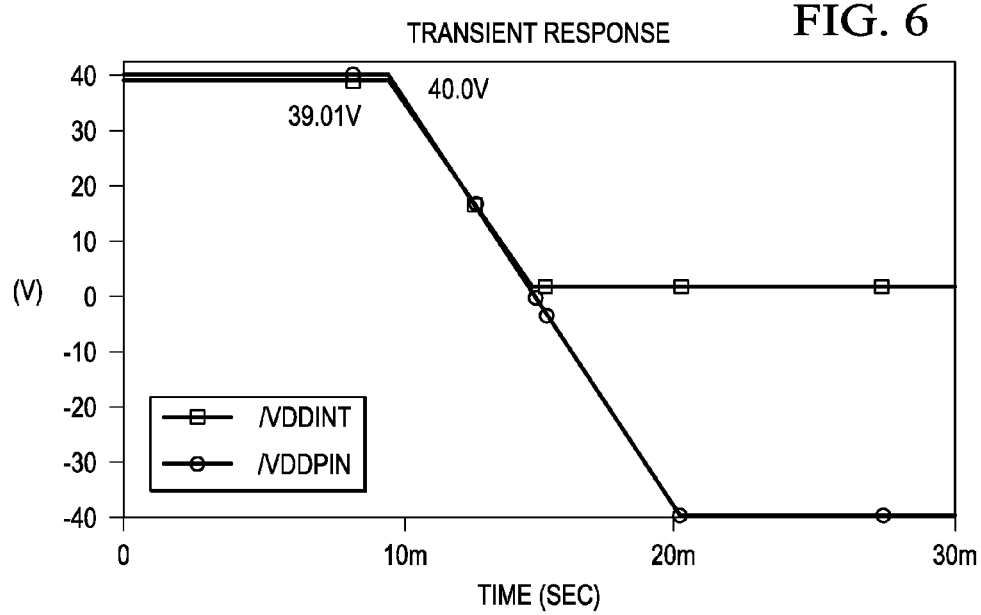
FIG. 6 is a voltage vs. time simulation of the response to a non-ESD high voltage positive and negative DC input to the ESD protection circuit of FIG. 2.

FIG. 6 illustrates an example of a simulation of both a low impedance positive voltage and a negative overvoltage protection, which in the illustrated simulation is +/−40 Volts, although this can change according to CMOS processes. A 50 ohm load is applied, although other loads can be used. The load can be a resistor of 50 ohm, although it can also be some other value, and can also be such elements as a current sink, etc. As is illustrated when VDDPIN is 40V, VDDINT is 39.01 volts. In the illustrated example, VDDINT tracks VDDPin within 1V, signifying the low impedance or low voltage drop nature of the circuit in positive DC mode. However, advantageously, when VDDPIN is −40V, VDDINT is nonetheless clamped at −2.854 uV. In other words, there is significant negative voltage protection for the load on VDDINT 302.

Figure 7:
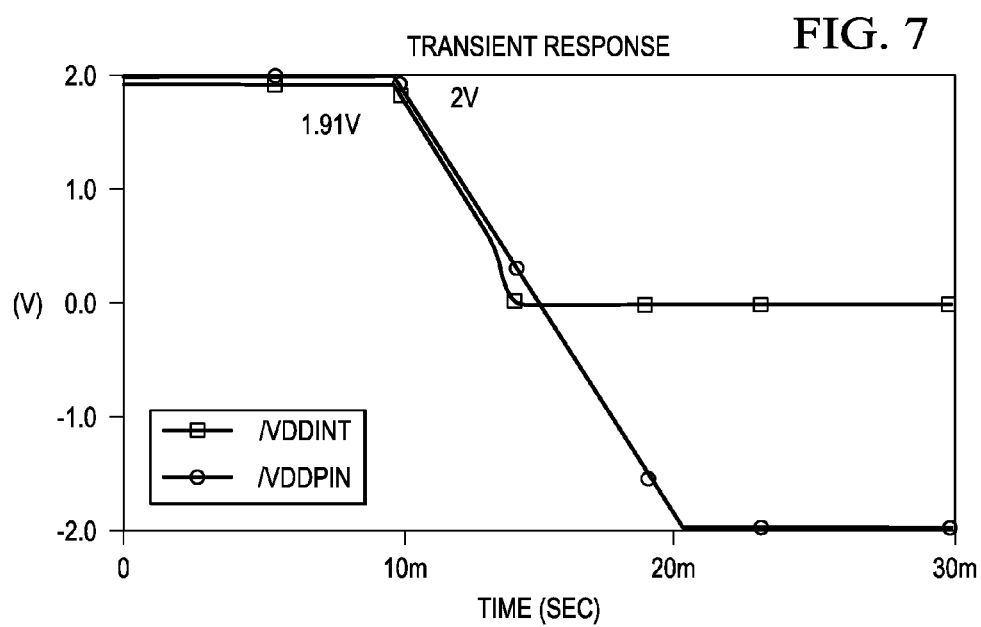
FIG. 7 is a voltage vs. time simulation of the response to a non-ESD low voltage positive and negative DC input to the ESD protection circuit of FIG. 2.

FIG. 7 illustrates an example of a typical usage of the circuit 200. As is illustrated, with a 50 ohm load on VDDINT 202, when BDDPIN 202 is 2V, VDDINT 204 is 1.81 V. When VDDINT is −2V, VDDING is clamped at −1.25 uV.

The ESD1 222 circuit provides current shunt property when VDDIN is stressed both positive and negative to GND. In the negative direction, it may have e characteristics of a forward biased. Any circuit with these characteristics can be used for ESD1 222.

Those skilled in the art to which this Application relates will appreciate that other and further additions, deletions, substitutions and modifications may be made to the described embodiments.

What is claimed is:

1. An apparatus, comprising:
    a first p-type field effect transistor (PFET) including a first intrinsic body diode;
    an electrostatic discharge (ESD) subcircuit coupled to a source of the first PFET;
    a reverse bias voltage element, an anode of which is coupled to a gate of the first PFET;
    a second PFET having a source coupled to a cathode of the reverse bias voltage element;
    a capacitor coupled to a gate the second PFET; and
    a first resistor coupled to the gate of the second PFET.

2. The apparatus of claim 1, wherein a drain of the first PFET and an anode of the first body diode is coupled to an input node.

3. The apparatus of claim 1, wherein the ESD subcircuit is coupled between an output node of the apparatus and a ground.

4. The apparatus of claim 3, wherein a second resistor is coupled between the gate of the first PFET and the ground.

5. The apparatus of claim 3, wherein the first resistor is coupled to the ground.

6. The apparatus of claim 3, wherein the capacitor is coupled in parallel between a drain of the second PFET and the gate of the second PFET.

7. The apparatus of claim 1, wherein the apparatus is embodied within a single integrated circuit.

8. The apparatus of claim 1, wherein the reverse bias voltage element is a zener diode.

9. An apparatus, comprising:
    a first PFET having a first body diode;
    an ESD subcircuit coupled to a source of the first PFET;
    a reverse bias voltage element, an anode of which is coupled to a gate of the first PFET;
    a second PFET, having a second body diode, having a source coupled to a cathode of the reverse bias voltage element;
    a first resistor coupled to a gate of the second PFET;
    a second resistor coupled between the gate of the first PFET and ground;
    a capacitor coupled to a gate the second PFET, wherein the capacitor is coupled in parallel between a drain of the second PFET and the gate of the second PFET, and
    wherein the first resistor is also coupled to the ground.

10. The apparatus of claim 9, wherein the apparatus has an output node at the source of the first PFET.

11. The apparatus of claim 9, wherein a spike of a positive current passes at least in part through the body diode of the first PFET and through the ESD subcircuit to the ground.

12. The apparatus of claim 9, wherein a spike of negative current passes through the ESD subcircuit and then through the first PFET to a node coupled to the drain of the first PFET.

13. The apparatus of claim 9, further comprising a voltage drop of at least a reverse bias voltage of a zener diode between the drain and the source of the first PFET.

14. The apparatus of claim 9, wherein the apparatus is embodied within a single integrated circuit.

15. The apparatus of claim 9, wherein the second body diode conveys a voltage drop to the cathode of the reverse bias voltage element.

16. The apparatus of claim 9, wherein the first resistor and the first capacitor are configured to create a time constant to turn off the second PFET after an elapse of time of a negative voltage spike occurs on an input node.

17. The apparatus of claim 9, wherein the reverse bias voltage element is a zener diode.

18. An apparatus, comprising:
a first PFET having a first body diode;
an ESD subcircuit coupled to a source of the first PFET;
a reverse bias voltage element, an anode of which is coupled to a gate of the first PFET;
a second PFET, having a second body diode, having a source coupled to a cathode of the reverse bias voltage element;
a first resistor coupled to a gate of the second PFET;
a second resistor coupled between the gate of the first PFET and ground;
a capacitor coupled to a gate the second PFET, wherein the capacitor is coupled in parallel between a drain of the second PFET and the gate of the second PFET,
wherein the first resistor is also coupled to the ground, and
a first node is coupled to a drain of the first PFET, a drain of the second PFET, and the capacitor.

19. The apparatus of claim 18, wherein the apparatus has an output node at the source of the first PFET.

20. The apparatus of claim 18, wherein a spike of a positive current passes at least in part through the first body diode of the first PFET and through the ESD subcircuit to the ground.

21. The apparatus of claim 18, wherein a spike of negative current passes through the ESD subcircuit through the first PFET to a node coupled to the drain of the first PFET.

22. The apparatus of claim 18, further comprising a voltage drop of at least a reverse bias voltage of a zener diode between the drain and the source of the first PFET.

23. The apparatus of claim 18, wherein the second body diode conveys a voltage drop to the cathode of the reverse bias voltage element.

24. The apparatus of claim 18, wherein the apparatus is embodied within a single integrated circuit.

25. The apparatus of claim 18, wherein the capacitor has a variable capacitance.

26. The apparatus of claim 18, wherein the reverse bias voltage element is a zener diode.

27. The apparatus of claim 18, wherein the first PFET is a Drain Extended PMOS (DEPMOS).

* * * * *